(12) United States Patent
Tate, Jr. et al.

(10) Patent No.: US 6,196,280 B1
(45) Date of Patent: Mar. 6, 2001

(54) COMBINATION NOZZLE AND FUEL TANK FITTING FOR DELIVERING LIQUEFIED NATURAL GAS AND COMPONENTS THEREOF

(75) Inventors: Raymond E. Tate, Jr., Felton; Harold M. Lee, Los Gatos; Alan T. Ziegler, Santa Cruz, all of CA (US)

(73) Assignee: Liberty Fuels, Inc., Watsonville, CA (US)

( * ) Notice: Subject to any disclaimer, the term of this patent is extended or adjusted under 35 U.S.C. 154(b) by 0 days.

(21) Appl. No.: 09/375,662

(22) Filed: Aug. 17, 1999

(51) Int. Cl.[7] ........................................................ B65B 1/04
(52) U.S. Cl. .......................... 141/302; 141/59; 141/301; 141/387
(58) Field of Search ................. 141/44, 46, 59, 141/82, 301, 302, 387–389

(56) References Cited

U.S. PATENT DOCUMENTS 5,301,723 * 4/1994 Goode ................................. 141/59
5,327,730 7/1994 Myers et al. ............................ 62/9
5,353,849 * 10/1994 Sutton et al. .......................... 141/44
5,386,699 2/1995 Myers et al. ............................ 62/9

* cited by examiner

Primary Examiner—Steven O. Douglas
(74) Attorney, Agent, or Firm—Flehr Hohbach Test Albritton & Herbet LLP

(57) ABSTRACT

A combination of a nozzle and a fuel tank fitting for delivering liquefied natural gas (LNG) from a dispenser to a fuel tank. The fuel tank fitting comprises first and second valve assemblies coupled to the fuel tank in close proximity to each other. Each valve assembly has a flow passage extending therethrough in communication with the interior of the tank. The nozzle comprises a housing forming a handle portion and a nozzle portion for mating with the valve assemblies of the fuel tank fitting to form a liquid-tight seal therebetween. First and second flow passages extend through the nozzle and provide respectively a fuel supply line and a vent return line. First and second valve assemblies are disposed in the first and second flow passages in the nozzle. A releasable cooperative clamp is carried by the fuel tank fitting and the nozzle for securing the nozzle to the tank fitting when the nozzle has been mated to the fuel tank fitting.

11 Claims, 3 Drawing Sheets

COMBINATION NOZZLE AND FUEL TANK FITTING FOR DELIVERING LIQUEFIED NATURAL GAS AND COMPONENTS THEREOF

This invention relates to a combination nozzle and fuel tank fitting for delivering liquefied natural gas and components thereof.

Nozzles have heretofore been provided for delivering liquefied natural gas to vehicles. However, such liquefied natural gas (LNG) filling nozzles have been uninsulated which when delivering fuel would frost up. Therefore there is a substantial loss of the cryogenic LNG in cooling down the nozzle until the nozzle gets cold enough to keep the LNG in a liquid form. Such LNG filling nozzles typically have required a trained attendant that must normally wear gloves and a safety mask. There is therefore a need for a new and improved LNG filling nozzle which overcomes these disadvantages and is more user friendly.

In general, it is an object of the present invention to provide a combination nozzle and fuel tank fitting for delivering liquefied natural gas which can be utilized without a specialized attendant and permitting use of the same by a typical lay person capable of filling gas tanks of gasoline powered vehicles.

Another object of the invention is to provide a combination of the above character which has breakaway characteristics permitting the nozzle to separate from the fuel tank fitting in the event a user inadvertently drives the vehicle away without disconnecting the nozzle from the fuel tank fitting.

Another object of the invention is to provide a combination of the above character in which upon breakaway, the supply of LNG through the nozzle will be automatically terminated.

Another object of the invention is to provide a combination of the above character in which separate fuel delivery lines and vent return lines are provided.

Another object of the invention is to provide a combination of the above character in which the separate fuel delivery line and vent return line are insulated from each other and from ambient.

Another object of the invention is to provide a combination of the above character in which the nozzle is provided with an easily accessible operating lever controllable by the fingers of the same hand holding the nozzle to initiate and terminate the delivery of LNG and return of vented gas through the nozzle.

Additional objects and features of the invention will appear from the following description in with the preferred embodiment is set forth in detail in conjunction with the accompanying drawings.

In general, the combination of the nozzle and fuel tank fitting for delivering liquefied natural gas from a dispenser to a fuel tank of a vehicle is one in which the fuel tank fitting comprises first and second valve assemblies coupled to the fuel tank in close proximity to each other and providing first and second flow passages in communication with the interior of the fuel tank with the first flow passage serving as a fuel delivery inlet and the second flow passage serving as a gas vent return. The nozzle comprises a housing providing a handle portion and a nozzle portion. The nozzle portion can mate with the first and second valve assemblies of the fuel tank fitting and form a liquid-tight seal therebetween. The housing includes means providing first and second flow passages extending through the nozzle and providing respectively a fuel supply line and a vent return line for communication respectively with the fuel inlet line of the fuel tank fitting and the gas vent return line of the fuel tank fitting. First and second valve assemblies are disposed in the first and second flow passages in the nozzle portion of the housing. Each of the valve assemblies in the fuel tank fitting and the first and second valve assemblies in the nozzle portion comprise a valve seat surrounding a flow passage. Each valve assembly also includes a valve member mounted in the flow passage and movable between open and closed positions with respect to the valve seat. Means is provided for engaging the valve member for yieldably urging the valve member toward the closed position. Each valve member has a portion extending beyond the valve seat when the valve member is in a closed position. The portions of the valve members in the fuel supply lines and in the vent return lines are in alignment when the nozzle is mated with the fuel tank fitting so that the valve members are moved to open positions against the force of the yieldable means to permit the flow of liquefied natural gas from the nozzle into the fuel tank fitting into the tank of the vehicle. Releasable cooperative clamping means is carried by the fuel tank fitting and the nozzle for securing the nozzle to the fuel tank fitting.

Figure 1:
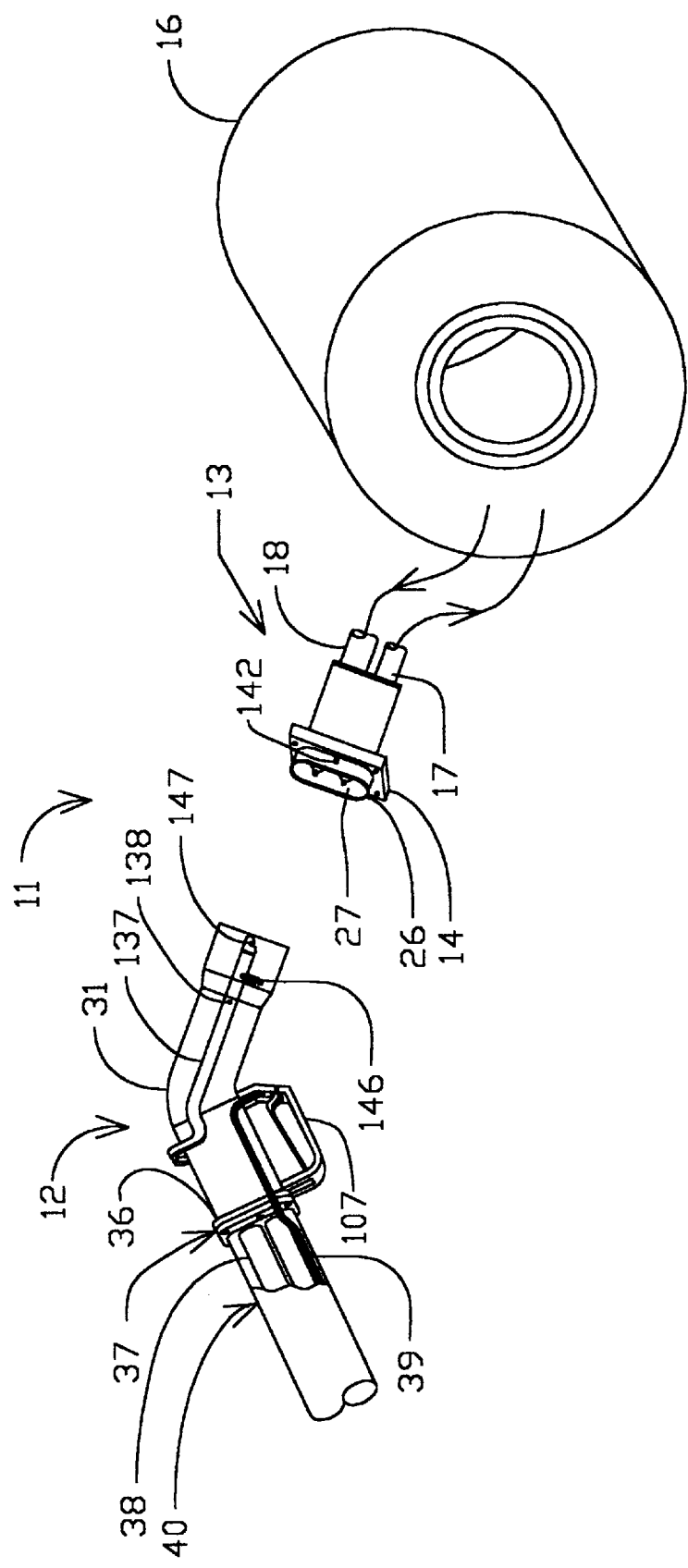
FIG. 1 is a schematic illustration of a delivery system for delivering liquefied natural gas to a vehicle incorporating the present invention.

More in particular as shown in FIG. 1 of the drawings, the combination 11 consists of a nozzle 12 and a fuel tank fitting 13. The fuel tank fitting 13 consists of a plate 14 formed of a suitable material such as stainless steel which is secured to the vehicle in an appropriate manner and is coupled to the interior space of an LNG tank 16 carried by the vehicle (not shown) by an insulated LNG delivery pipe 17 and an insulated vent return pipe 18. First and second valve assemblies 21 and 22 are mounted on the plate 16 in a suitable manner such as welding with the first valve assembly 21 serving as a fuel inlet valve assembly in communication with the delivery pipe 17 and the second valve assembly 22 in communication with the vent return pipe 18 serving as a gas vent from the fuel tank. The first and second valve assemblies 21 and 22 are substantially identical to one another with the exception that the first valve assembly is approximately 75% of the size of the second valve assembly. An upstanding shroud 26 is mounted on the plate 16 and surrounds the first and second valve assemblies 21 and 22 and provides a recess or receptacle 27 for mating with the nozzle 12 as hereinafter described.

The nozzle 12 consists of a housing 31 which is comprised of a handle portion 31a, an inclined nozzle portion 31b and a shroud portion 31c. A female bayonet-type fitting 36 is mounted on the proximal extremity of the housing 31 and is removably connected to a mating male bayonet-type fitting 37. The fitting 37 is connected to a conventional flexible triaxial vacuum-insulated hose 38. The hose 40 is adapted to be connected to an LNG fuel dispenser (not shown) such as disclosed in co-pending application Ser. No. 09/375,663, filed Aug. 17, 1999 (A-68212).

Figure 2:
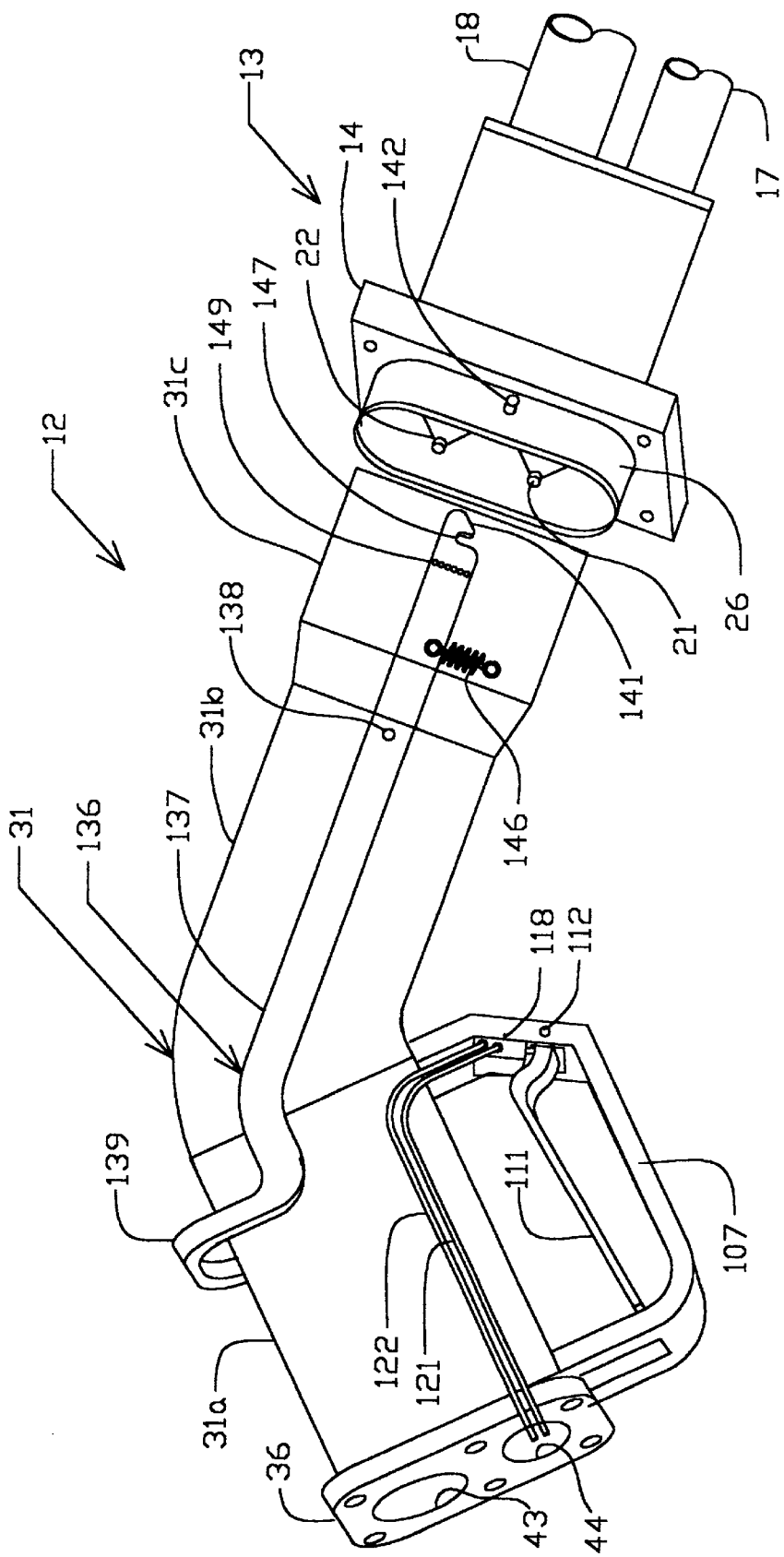
FIG. 2 is an isometric view of the combination nozzle and the fuel tank fitting for shown in FIG. 1.
Figure 3:
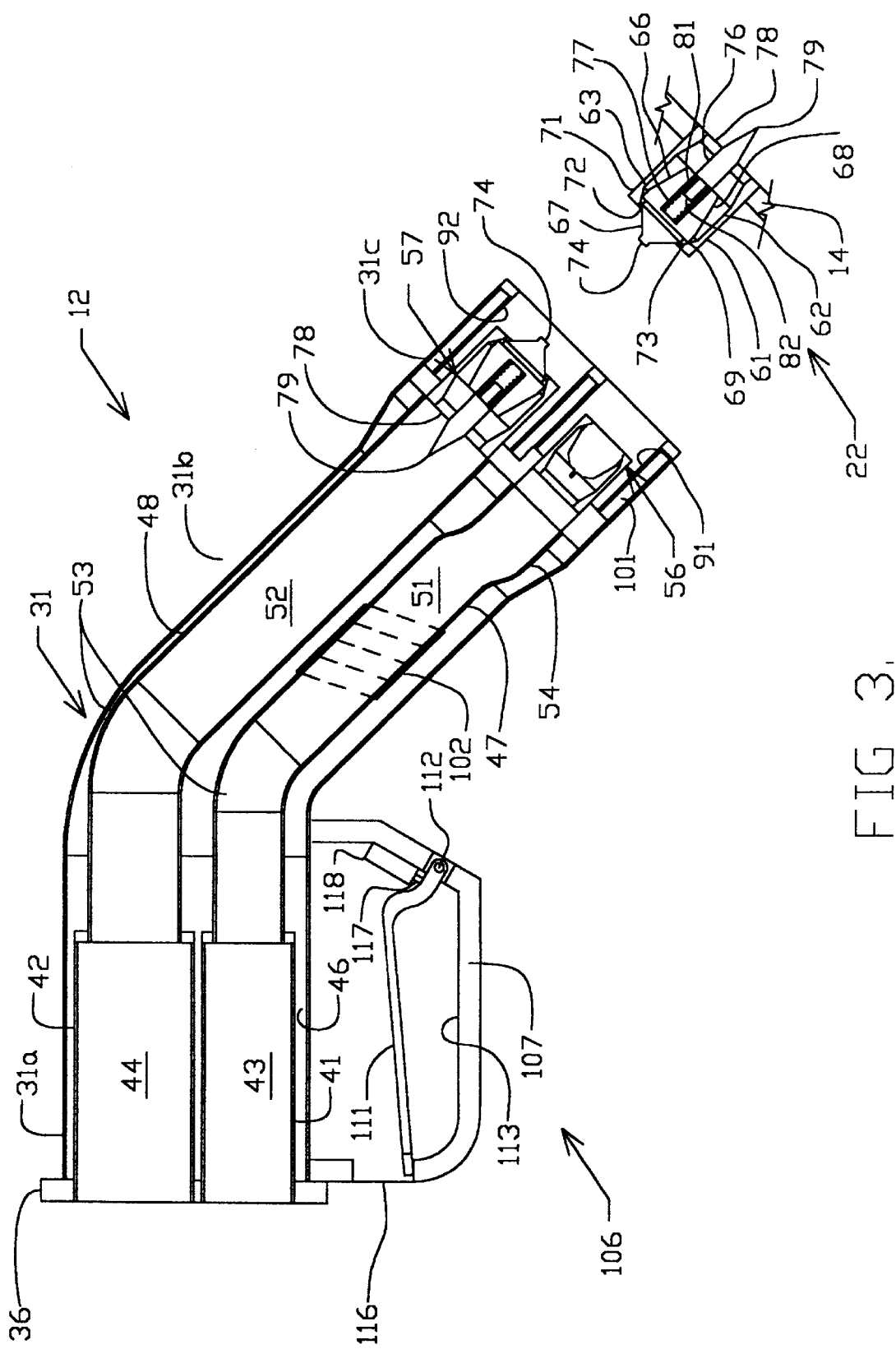
FIG. 3 is a sectional view of portions of the combination shown in FIG. 1.

First and second rigid tubes 41 and 42 are provided within the handle portion 31a of the housing 31 and have flow passages 43 and 44 therein which are in communication with the flow passages (not shown) of the hoses 38 and 39. As shown in FIG. 2, the tubes 41 and 42 are spaced apart from each other and also are spaced apart from the handle portion 31a of the housing to provide a space 46 which as hereinafter described can be evacuated to provide insulation between first and second tubes 41 and 42 and between the tubes 41 and 42 and the housing 31. Additional first and second tubes 47 and 48 are provided within the housing 31 and are of a slightly reduced diameter and are provided with first and second flow passages 51 and 52 which are in communication with the flow passages 43 and 44. The flow passages 51 and 52 are provided with bends 53 of a suitable angle as for example approximately 45° to accommodate the inclination of the nozzle portion 31b of the housing 31 with respect to the handle portion 31a. The first tube 47 is provided with additional offset or bend 54 as it extends into the shroud portion 31c of the housing 31.

A first or vent return valve assembly 56 is mounted within the shroud portion 31c and is in communication with the flow passage 51. A second or fuel supply valve assembly 57 is also provided in the shroud portion 31c and is in communication with the flow passage 52. The valve assemblies 56 and 57 are very similar to the first and second valve assemblies 21 and 22 provided in the fuel tank fitting 13. The first or fuel supply valve assembly 56 has a size as for example approximately 75% of the size of the first or vent return valve assembly 57.

The construction of these four valve assemblies 21 and 22 and 56 and 57 shown in the drawings are substantially identical. Each of these valve assemblies consists of a valve body 61 of stainless steel which is provided with a flow passage 62 extending therethrough. The valve body is provided with an inclined valve seat 63 which surrounds the flow passage 62. A valve member 66 of stainless steel is movably mounted in the flow passage 62 of the valve body 61. The valve member 66 which can be characterized as a valve plug is provided with first and second truncated conical surfaces 67 and 68 and which adjoin a cylindrical surface 69. The truncated conical surface 67 has a length which is less than the truncated conical surface 68. A seal ring 71 formed of a suitable material such as Kel-F™ is mounted in a recess 72 formed in the surface 67. The ring 71 is provided with an inclined surface 73 which is adapted to engage the inclined surface provided by the valve seat 63 to form a liquid-tight seal between the same. The truncated conical surface 67 terminates in a circular flat 74 which is perpendicular to a central axis extending through the valve member 66.

Guiding means is provided for axially guiding the valve member 66 along the axis of the valve body between open and closed positions with respect to the valve seat 63 along the central axis of the valve member 66 and consists of an alignment pin 76 that is slidably disposed in a bore 77 in the valve member 66. Means is providing for mounting the alignment pin 76 in a fixed position with respect to the valve body 61 and consists of three equally circumferentially spaced apart pins 78 that are attached in a suitable manner such as by welding to the alignment pin 76 and to the valve body 61. These pins 78 have spaces therebetween to permit the flow of gas or liquid therethrough without substantially impeding the flow. The alignment pin 76 is provided with a tapered point 79 to minimize turbulence of a liquid or a gas passing the alignment pin 76.

It can be seen that the alignment pin 76 serves to guide the valve member 66 in the valve body 61 so that the valve member 66 travels in a precise manner in moving between open and closed positions with respect to the valve seat 63. Yieldable means is provided for yieldably urging the valve member 66 into engagement with the valve seat 63 and consists of yieldable means in the form of a spring 81 providing a suitable force ranging from 15 to 30 pounds and preferably approximately 20 pounds. The spring 81 in the form of a coil spring is disposed within the bore 77 and has one end engaging the valve member 66 and the other end seated in an annular recess 82 on the alignment pin 76.

The valve assemblies 56 and 57 are adapted to seat within cylindrical recesses 91 and 92 provided within the shroud portion 31c of the housing and are sized so that they are adapted to fit over and mate with the first and second valve assemblies 21 and 22.

The valve assemblies 56 and 57 as well as the first and second tubes 47 and 48 are spaced apart from each other and from the housing 31 to provide a space 101 therebetween in communication with the space 46. Spaces 101 and 46 are evacuated under a suitable vacuum as for example 0.11 milli Torr to provide insulation for the nozzle. In addition, the tubes 41 and 42 and 47 and 48 are individually wrapped with a suitable insulating material such as Mylar™ by wraps 102 to provide radiation shielding from warmth from ambient air to provide additional insulation.

A handle 106 is provided on the handle portion 31a of the housing 31 and consists of a generally U-shaped frame 107 formed of a suitable material such as aluminum which is welded to the portion 31a of the housing 31. A lever arm 111 is provided within the U-shaped frame 107 and is pivotably mounted by a pin 112 to the frame 107 at one end of the frame 107. The lever 111 extends across an opening 113 in the frame 107 and has its free extremity mounted for movement within a slot 116 provided in the frame 107. The lever arm 111 engages an actuator pin 117 of a pneumatic valve 118. The pneumatic valve 118 is connected by two pneumatic lines 121 and 122 which are connected to the LNG dispenser hereinbefore described for controlling the flow of LNG from the dispenser to the nozzle 12.

Releasable cooperative clamping means 136 is carried by the nozzle 12 and the fuel tank fitting 13 for securing the nozzle 12 to the fuel tank fitting 13 during the time that LNG is being supplied to the tank 16 of the vehicle. This clamping means 136 consists of first and second lever arms 137 provided on opposite sides of the exterior of the housing 31 and mounted on pivots 138 also provided on opposites sides of the housing 31. The lever arms 137 are connected to a U-shaped member 139 which extends proximally from the nozzle portion 31b and generally over the handle portion 31a of the housing 31 so that it is adapted to be engaged by the same hand grasping the handle portion 31a of the housing or alternatively by the other hand to move the lever arms to releasing positions.

The distal extremities of the lever arms 137 are provided with inclined camming surfaces 141 (FIG. 2) which are adapted to come into engagement with outwardly extending cylindrical pins 142 provided on the exterior of the shroud 26 during movement of the nozzle 12 into engagement with the tank fitting 13 to cam the distal extremities of the lever arms 137 over the pins 142 against the force of a yieldable means in the form of springs 146 provided on the exterior of the housing 31. Thus as shown, the springs 146 are secured to the lever arms distal of the pivots 138 and to the housing 31. The lever arms 137 are provided with semicircular notches 147 just proximal of the camming surfaces 141 which are adapted to receive the pins 142 as the nozzle is pushed over the shroud 26 of the fuel tank fitting 13. The lever arms 137 snap into latching positions under the force of the springs 146. Holes 149 are provided in the lever arms 137 just proximal of the notches 147 and are sized so that the lever arms 137 will break when a predetermined force is applied to the same to provide breakaway capabilities for the nozzle as hereinafter described.

Operation and use of the combination nozzle and fuel tank fitting for delivering liquefied natural gas will now be briefly described as follows. Let it be assumed that a vehicle fueled with LNG desires additional fuel and has driven into a dispensing station which dispenses LNG. Let it also be assumed that the dispensing station has been provided with a nozzle of the type hereinbefore described. The driver or other person traveling with the vehicle picks up the nozzle 12 by using one hand to grasp the handle portion 31a of the nozzle housing 31 and lifts the nozzle 12 with the tri-axial hose 38 connected thereto and moves the nozzle 12 into engagement with the fuel tank fitting 13 by inserting the shroud portion 31c of the housing 31 into the shroud 26 of the fuel tank fitting which at the same time causes engagement of the flats 74 of the valve members 66 of the valve assemblies 21 and 22 to engage the corresponding flats of the valve members 66 of the valve assemblies 56 and 57 to cause movement of the yieldable valve members 66 against the force of the springs 81 to move the valve members 66 to open positions with respect to the valve seats 63. At the same time that this is occurring, the camming surfaces 141 of the lever arms 137 come into engagement with the pins 142 to cam the lever arms over the pins 142 against the force of the springs 146. Further movement of the nozzle 12 into the shroud 26 of the fuel tank fitting 31 causes travel of the lever arms 137 until the notches 417 come into engagement and seat on the pins 142 to releasably secure the nozzle 12 to the tank fitting 13.

As soon as this mating of the nozzle 12 with the fuel tank fitting 13 has been accomplished, LNG dispensing to the tank of the vehicle can be commenced by raising the lever 111 with the fingers of the hand grasping the handle portion 31a of the housing 31 to cause operation of the pneumatic valve 118 which through piping 121 and 122 causes operation of the dispensing assembly to supply LNG to the flow passage 43, the flow passage 51 through the valve assembly 56 and past the valve assembly 21 into the line 17 connected to the fuel tank 16 of the vehicle. As the LNG is being supplied to the tank, the natural gas in the gaseous phase in the tank is removed through the valve assembly 22 into the valve assembly 57 through the flow passages 51 and 43 and through the tri-axial hose 38 to the dispensers (not shown). As explained in copending application Ser. No. 09/375,663 filed Aug. 19, 1999 upon operation of pneumetic control 118 by the lever 111, the suction side of the compressor at the dispenser is connected to the vent flow passage 44 to withdraw natural gas in the vapor phase in the tank 16 so that LNG can be delivered to the tank without the use of a cryogenic pump. Dispensing of LNG is continued until the desired amount of LNG has been dispensed into the tank or until the tank of the vehicle has been filled. Dispensing can then be terminated by returning the lever arm 111 to its home position permitting movement of the actuator pin 117 to operate the pneumatic valve 118 to terminate dispensing of LNG from the dispensing station. During the time that LNG is being dispensed by the nozzle 12, the nozzle remains frost-free and can be engaged and operated by the bare human hand because of the insulation provided in the nozzle as hereinbefore described. This insulation in addition to making the nozzle user friendly also serves to prevent wastage of LNG which normally would turn into gas as it cools the nozzle during a dispensing operation.

After the desired amount of LNG has been dispensed in the fuel tank of the vehicle, the operator holding the nozzle 12 can separate the nozzle 12 from the fuel tank fitting 13 by engaging the U-shaped member 139 with the same hand holding the nozzle 12 or alternatively by the other hand and pushing it downwardly against the force of the springs 146 to cause the lever arms 137 to disengage from the pins 142. As soon as this disengagement occurs, the nozzle 12 can be pulled out of the shroud 26 of the fuel tank fitting 13 and replaced in the dispenser station, after which it is ready for use by another vehicle to be filled with LNG.

As hereinbefore explained, the combination of the nozzle 12 and the fuel tank fitting 13 is provided with breakaway capabilities. Such breakaway capabilities are desirable in order to prevent serious damage to the fuel tank fitting 13 and for the nozzle 12 in the event that a driver of a vehicle drives off without disconnecting the nozzle 12 from the fuel tank fitting 13. Upon such an occurrence, the lever arms 137 will separate at the breakaway which is provided by the holes 149 in the lever arms. The holes 149 are sized to provide weakened regions for the lever arms so that they will separate at that point to provide breakaway capabilities releasing the nozzle 12 from the fuel tank fitting 13 and thereby minimizing the damage in the event of an inadvertent drive-off of the vehicle without disconnecting the nozzle 12 from the fuel tank fitting 13. In the event of such a breakaway, the valve assemblies 56 and 57 carried by the nozzle will immediately be moved to the closed position by the springs 81 in the nozzle 12 to prevent any escape of LNG from the nozzle. Similarly, the valve assemblies 21 and 22 carried by the fuel tank fitting 13 will immediately close, also under the force of the springs 81 provided therein.

From the foregoing it can be seen that there has been provided a combination nozzle and fuel tank fitting for delivery of liquefied natural gas to a vehicle which is user friendly. It is frost free, permitting the nozzle to be handled in the same way as a nozzle in a conventional gas station. The nozzle is relatively compact and simple and carries both the LNG fuel supply and the vent return lines. The construction of the nozzle is such that it is operated in a manner similar to the operation of nozzles utilized in conventional gasoline filling stations, thereby eliminating the need for training in its use.

What is claimed:

1. A combination of a nozzle and a fuel tank fitting for delivering liquefied natural gas (LNG) from a dispenser to a fuel tank by use of an adult human hand, the fuel tank fitting comprising first and second valve assemblies coupled to the fuel tank in close proximity to each other and each valve assembly having a flow passage extending therethrough in communication with the interior of the tank, the nozzle comprising a housing forming a handle portion and a nozzle portion, the handle portion being sized so that it can be grasped by the adult human hand, the nozzle portion being formed for mating with the valve assemblies of the fuel tank fitting to form a liquid-tight seal therebetween, piping means within the housing forming first and second flow passages extending through the nozzle and providing respectively a fuel supply line and a vent return line, first and second valve assemblies disposed in the first and second flow passages in the nozzle portion, and each of the valve assemblies in the fuel tank fitting and in the nozzle comprising a valve body having a flow passage therein and having a valve seat surrounding the flow passage, a valve member mounted in the flow passage in the valve body and movable between open and closed positions with respect to the valve seat in the valve body, yieldable means engaging the valve member for yieldably urging the valve member toward the closed position, each valve member having a portion thereof extending beyond the valve seat when the valve member is in a closed position, said portions of said valve members in the fuel supply lines being in alignment with each other when the nozzle is brought into engagement with the fuel tank fitting and said portions of said valve members in the vent return lines being in alignment with each other when the nozzle is brought into engagement with the fuel tank fitting whereby when the nozzle is mated with the fuel tank fitting, the valve members are moved to open positions against the force of the yieldable means, releasable cooperative clamping means carried by the fuel tank fitting and the nozzle for securing the nozzle to the tank fitting when the nozzle has been mated to the fuel tank fitting and lever means mounted on the nozzle adjacent the handle portion of the housing adapted to be operated by the hand grasping the handle portion for controlling the delivery of LNG from the dispenser to the nozzle.

2. The combination as in claim 1 wherein the nozzle is provided with insulation to provide a housing which is frost-free when LNG is being dispensed from the nozzle to make it possible for the human hand to hold the handle portion of the housing during dispensing of the LNG from the nozzle and while the lever means is being operated by the human hand, said insulation being comprised of evacuated spaces between the housing and the piping means forming the flow passages.

3. A combination of a nozzle and a fuel tank fitting for delivering liquefied natural gas (LNG) from a dispenser to a fuel tank by the use of a human hand having fingers, the fuel tank fitting comprising first and second valve assemblies coupled to the fuel tank in close proximity to each other and each valve assembly having a flow passage extending therethrough in communication with the interior of the tank, the nozzle comprising a housing forming a handle portion and a nozzle portion, the nozzle portion being formed for mating with the valve assemblies of the fuel tank fitting to form a liquid-tight seal therebetween, piping means within the housing forming first and second flow passages extending through the nozzle and providing respectively a fuel supply line and a vent return line, first and second valve assemblies disposed in the first and second flow passages in the nozzle portion, and each of the valve assemblies in the fuel tank fitting and in the nozzle comprising a valve body having a flow passage therein and having a valve seat surrounding the flow passage, a valve member mounted in the flow passage in the valve body and movable between open and closed positions with respect to the valve seat in the valve body, yieldable means engaging the valve member for yieldably urging the valve member toward the closed position, each valve member having a portion thereof extending beyond the valve seat when the valve member is in a closed position, said portions of said valve members in the fuel supply lines being in alignment with each other when the nozzle is brought into engagement with the fuel tank fitting and said portions of said valve members in the vent return lines being in alignment with each other when the nozzle is brought into engagement with the fuel tank fitting whereby when the nozzle is mated with the fuel tank fitting, the valve members are moved to open positions against the force of the yieldable means, releasable cooperative clamping means carried by the fuel tank fitting and the nozzle for securing the nozzle to the tank fitting when the nozzle has been mated to the fuel tank fitting, and means carried by the nozzle for controlling delivery of LNG from the dispenser to the nozzle, said means including a lever arm disposed in the vicinity of the handle portion of the housing adapted to be grasped by the fingers of a hand engaging the handle portion of the housing for operating the same and a pneumatic valve carried by the nozzle and engagable by the lever arm.

4. A combination of a nozzle and a fuel tank fitting for delivering liquefied natural gas (LNG) from a dispenser to a fuel tank, the fuel tank fitting comprising first and second valve assemblies coupled to the fuel tank in close proximity to each other and each valve assembly having a flow passage extending therethrough in communication with the interior of the tank, the nozzle comprising a housing forming a handle portion and a nozzle portion, the nozzle portion being formed for mating with the valve assemblies of the fuel tank fitting to form a liquid-tight seal therebetween, piping means within the housing forming first and second flow passages extending through the nozzle and providing respectively a fuel supply line and a vent return line, first and second valve assemblies disposed in the first and second flow passages in the nozzle Portion, and each of the valve assemblies in the fuel tank fitting and in the nozzle comprising a valve body having a flow passage therein and having a valve seat surrounding the flow passage, a valve member mounted in the flow Passage in the valve body and movable between open and closed positions with respect to the valve seat in the valve body, yieldable means engaging the valve member for yieldably urging the valve member toward the closed position, each valve member having a portion thereof extending beyond the valve seat when the valve member is in a closed position. said portions of said valve members in the fuel supply lines being in alignment with each other when the nozzle is brought into engagement with the fuel tank fitting and said portions of said valve members in the vent return lines being in alignment with each other when the nozzle is brought into engagement with the fuel tank fitting whereby when the nozzle is mated with the fuel tank fitting, the valve members are moved to open positions against the force of the yieldable means, releasable cooperative clamping means carried by the fuel tank fitting and the nozzle for securing the nozzle to the tank fitting when the nozzle has been mated to the fuel tank fitting and alignment means for each of the valve assemblies for causing aligned movement of the valve member with respect to the valve seat, said alignment means consisting of an alignment pin mounted in a fixed position with respect to the valve body, said valve member having a bore therein receiving said alignment pin, said yieldable means being in the form of a spring disposed in the bore and engaging the valve member and the alignment pin.

5. A combination of a nozzle and a fuel tank fitting for delivering liquefied natural gas (LNG) from a dispenser to a fuel tank, the fuel tank fitting comprising first and second valve assemblies coupled to the fuel tank in close proximity to each other and each valve assembly having a flow passage extending therethrough in communication with the interior of the tank, the nozzle comprising a housing forming a handle portion and a nozzle portion, the nozzle portion being formed for mating with the valve assemblies of the fuel tank fitting to form a liquid-tight seal therebetween, piping means within the housing forming first and second flow passages extending through the nozzle and providing respectively a fuel supply line and a vent return line, first and second valve assemblies disposed in the first and second flow passages in the nozzle portion, and each of the valve assemblies in the fuel tank fitting and in the nozzle comprising a valve body having a flow passage therein and having a valve seat surrounding the flow passage, a valve member mounted in the flow passage in the valve body and movable between open and closed positions with respect to the valve seat in the valve body, yieldable means engaging the valve member for yieldably urging the valve member toward the closed position, each valve member having a portion thereof extending beyond the valve seat when the valve member is in a closed position, said portions of said valve members in the fuel supply lines being in alignment with each other when the nozzle is brought into engagement with the fuel tank fitting and said portions of said valve members in the vent return lines being in alignment with each other when the nozzle is brought into engagement with the fuel tank fitting whereby when the nozzle is mated with the fuel tank fitting, the valve members are moved to open positions against the force of the yieldable means and releasable cooperative clamping means carried by the fuel tank fitting and the nozzle for securing the nozzle to the tank fitting when the nozzle has been mated to the fuel tank fitting, said releasable cooperative clamping means including lever arms having portions thereof of reduced strength to provide breakaway capabilities in the event of the application of a force to the lever arms greater than a predetermined force.

6. A combination of a nozzle and a fuel tank fitting for delivering liquefied natural gas (LNG) from a dispenser to a fuel tank, the fuel tank fitting comprising first and second valve assemblies coupled to the fuel tank in close proximity to each other and each valve assembly having a flow passage extending therethrouqh in communication with the interior of the tank, the nozzle comprising a housing forming a handle portion and a nozzle portion, the nozzle portion being formed for mating with the valve assemblies of the fuel tank fitting to form a liquid-tight seal therebetween, piping means within the housing forming first and second flow passages extending through the nozzle and providing respectively a fuel supply line and a vent return line, first and second valve assemblies disposed in the first and second flow passages in the nozzle portion, and each of the valve assemblies in the fuel tank fitting and in the nozzle comprising a valve body having a flow passage therein and having a valve seat surrounding the flow passage, a valve member mounted in the flow passage in the valve body and movable between open and closed positions with respect to the valve seat in the valve body, yieldable means engaging the valve member for yieldably urging the valve member toward the closed position, each valve member having a portion thereof extending beyond the valve seat when the valve member is in a closed position, said portions of said valve members in the fuel supply lines being in alignment with each other when the nozzle is brought into engagement with the fuel tank fitting and said portions of said valve members in the vent return lines being in alignment with each other when the nozzle is brought into engagement with the fuel tank fitting whereby when the nozzle is mated with the fuel tank fitting, the valve members are moved to open positions against the force of the yieldable means and releasable cooperative clamping means carried by the fuel tank fitting and the nozzle for securing the nozzle to the tank fitting when the nozzle has been mated to the fuel tank fitting, the nozzle being provided with insulation to provide a frost-free housing when LNG is being dispensed from the nozzle, said insulation being comprised of evacuated spaces between the housing and the piping means forming the flow passages.

7. The combination as in claim 6 wherein the piping means providing the flow passages in the nozzles comprises separate spaced-apart tubes provided in the housing of the nozzle and wherein the insulation includes an insulating material disposed on the exterior surfaces of the tubes for insulating the tubes from each other and from the housing.

8. A nozzle adapted to be held by an adult human hand for delivering liquefied natural gas (LNG) from a dispenser and for use with a fuel tank fitting coupled to a fuel tank comprising a housing forming a handle portion adapted to be grasped by the adult human hand and a nozzle portion, the nozzle portion being formed for mating with the fuel tank fitting to form a liquid-tight seal therewith, piping means within the housing forming first and second flow passages extending through the nozzle and providing respectively a fuel supply line and a vent return line, first and second valve assemblies disposed in the first and second passages in the nozzle portion, each of the valve assemblies comprising a valve body having a flow passage therein and having a valve seat surrounding the flow passage, a valve member mounted in the flow passage in the valve body and movable between open and closed positions with respect to the valve seat in the valve body, yieldable means engaging the valve member for yieldably urging the valve member towards the closed position and lever means mounted on the nozzle in the vicinity of the handle Portion and adapted to be operated by the human hand grasping the handle Portion for controlling the supply of LNG to the nozzle from the dispenser.

9. A nozzle as in claim 8 further including clamping means carried by the housing for clamping the nozzle to the fuel tank fitting.

10. A nozzle as in claim 8, wherein said lever means includes a lever arm pivotably mounted with respect to the housing, automatic valve means carried by the housing and having an actuator adapted to be engaged by the lever arm and adapted to be connected to the dispenser.

11. A fuel tank fitting for delivering liquefied natural gas (LNG) from a dispenser to a fuel tank by the use of a nozzle connected to the dispenser, comprising first and second valve assemblies coupled to the fuel tank in close proximity to each other, each valve assembly having a flow passage extending therethrough in communication with the interior of the tank, each valve assembly comprising a valve body having a flow passage therein and a valve seat surrounding the flow passage, a valve member mounted in the flow passage in the valve body and movable between open and closed positions with respect to the valve seat in the valve body, yieldable means engaging the valve member for yieldably urging the valve member toward the closed position, each valve member having a portion thereof extending beyond the valve seat when the valve member is in a closed position and alignment means for each of the valve assemblies for causing alignment movement of the valve member with respect to the valve seat, the alignment means comprising an alignment pin mounted in a fixed position with respect to the valve body, said valve member having a bore therein receiving said alignment pin, said yieldable means being in the form of a spring disposed in the bore and engaging the valve member and the alignment pin.

* * * * *